US010061742B2

(12) United States Patent
Lang et al.

(10) Patent No.: US 10,061,742 B2
(45) Date of Patent: Aug. 28, 2018

(54) ADVERTISING IN A DIGITAL MEDIA PLAYBACK SYSTEM

(75) Inventors: Jonathan Lang, Santa Barbara, CA (US); Ron Kuper, Arlington, MA (US)

(73) Assignee: SONOS, INC., Santa Barbara, CA (US)

( * ) Notice: Subject to any disclaimer, the term of this patent is extended or adjusted under 35 U.S.C. 154(b) by 118 days.

(21) Appl. No.: 12/694,212

(22) Filed: Jan. 26, 2010

(65) Prior Publication Data

US 2013/0254340 A1 Sep. 26, 2013

Related U.S. Application Data

(60) Provisional application No. 61/148,883, filed on Jan. 30, 2009.

(51) Int. Cl.

| | |
|---|---|
| ***G06Q 30/00*** | (2012.01) |
| ***G06F 15/16*** | (2006.01) |
| ***G06Q 30/02*** | (2012.01) |
| ***H04N 21/433*** | (2011.01) |
| ***H04H 60/58*** | (2008.01) |
| ***H04H 60/74*** | (2008.01) |
| ***H04N 21/2368*** | (2011.01) |
| ***H04N 21/436*** | (2011.01) |
| ***H04N 21/439*** | (2011.01) |

(52) U.S. Cl.

CPC ............ *G06F 15/16* (2013.01); *G06Q 30/02* (2013.01); *H04H 60/58* (2013.01); *H04H 60/74* (2013.01); *H04N 21/2368* (2013.01); *H04N 21/4331* (2013.01); *H04N 21/4394* (2013.01); *H04N 21/43615* (2013.01)

(58) Field of Classification Search

USPC ........................................................... 705/14

See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |

(Continued)

FOREIGN PATENT DOCUMENTS

| | | | |
|---|---|---|---|
| EP | 1389853 | A1 | 2/2004 |
| WO | 200153994 | | 7/2001 |

(Continued)

OTHER PUBLICATIONS http://www.chebucto.ns.ca/~rakerman/radiostation.html My Internet Radio Station.pdf.*

(Continued)

*Primary Examiner* — Eric R Netzloff
*Assistant Examiner* — Christopher Stroud

(57) ABSTRACT

Techniques pertaining to advertising through a digital data network are disclosed. Advertisement information is embedded in multimedia data stream as structured metadata, and transmitted through networks. Multimedia players installed in different locations, or zones, in a data network are configured to receive the stream data, and detect the presence of the embedded metadata. Through a network interface in the player, the metadata information is transmitted to and displayed on a controller. A user input interface in the controller allows a user to response to the displayed metadata and select to obtain the desired information accordingly.

15 Claims, 6 Drawing Sheets

240
242
244
246
248
262
264
zones
back
music
Now Playing
image
vol
ok
Scroll Wheel 250
252
266
268
254

(56) References Cited

U.S. PATENT DOCUMENTS 5,923,902 A 7/1999 Inagaki
6,032,202 A 2/2000 Lea et al.
6,130,726 A * 10/2000 Darbee et al. ................ 348/734
6,256,554 B1 7/2001 DiLorenzo
6,404,811 B1 6/2002 Cvetko et al.
6,456,892 B1 * 9/2002 Dara-Abrams et al. ........ 700/83
6,469,633 B1 10/2002 Wachter
6,522,886 B1 2/2003 Youngs et al.
6,611,537 B1 8/2003 Edens et al.
6,631,410 B1 10/2003 Kowalski et al.
6,757,517 B2 6/2004 Chang
6,778,869 B2 8/2004 Champion
6,950,623 B2 * 9/2005 Brown et al. ................ 455/3.01
7,130,608 B2 10/2006 Hollstrom et al.
7,130,616 B2 10/2006 Janik
7,143,939 B2 12/2006 Henzerling
7,236,773 B2 6/2007 Thomas
7,295,548 B2 11/2007 Blank et al.
7,391,791 B2 6/2008 Balassanian et al.
7,483,538 B2 1/2009 McCarty et al.
7,490,053 B1 * 2/2009 Emerson et al. .......... 705/14.61
7,571,014 B1 8/2009 Lambourne et al.
7,630,501 B2 12/2009 Blank et al.
7,643,894 B2 1/2010 Braithwaite et al.
7,657,910 B1 2/2010 McAulay et al.
7,739,596 B2 * 6/2010 Clarke-Martin et al. ..... 715/716
7,853,341 B2 12/2010 McCarty et al.
7,987,294 B2 7/2011 Bryce et al.
8,014,423 B2 9/2011 Thaler et al.
8,045,952 B2 10/2011 Qureshey et al.
8,103,009 B2 1/2012 McCarty et al.
8,234,395 B2 7/2012 Millington et al.
8,285,809 B2 * 10/2012 McCue et al. ................ 709/217
8,483,853 B1 7/2013 Lambourne
8,942,252 B2 1/2015 Balassanian et al.
2001/0042107 A1 11/2001 Palm
2002/0022453 A1 2/2002 Balog et al.
2002/0022989 A1 * 2/2002 Endo ...................... G06Q 30/02 705/14.4
2002/0026442 A1 2/2002 Lipscomb et al.
2002/0068525 A1 * 6/2002 Brown et al. ................ 455/3.01
2002/0124097 A1 9/2002 Isely et al.
2003/0157951 A1 8/2003 Hasty
2003/0187730 A1 * 10/2003 Natarajan et al. .............. 705/14
2004/0024478 A1 2/2004 Hans et al.
2004/0117400 A1 * 6/2004 McCrystal ............. G06Q 30/02
2006/0075439 A1 * 4/2006 Vance ............................. 725/81
2007/0142944 A1 6/2007 Goldberg et al.
2007/0174866 A1 * 7/2007 Brown ............... H04N 7/17318 725/28
2007/0240232 A1 * 10/2007 Pino et al. ...................... 726/28
2008/0066098 A1 * 3/2008 Witteman ............. G06Q 30/02 725/34
2008/0071881 A1 * 3/2008 Kronlund et al. ............ 709/217
2008/0091643 A1 * 4/2008 Malik ............... G06F 17/30749
2008/0098450 A1 * 4/2008 Wu .................... H04N 21/4312 725/132
2008/0120501 A1 * 5/2008 Jannink ............. G06F 17/30017 713/163
2008/0301318 A1 * 12/2008 McCue et al. ................ 709/231
2009/0063274 A1 * 3/2009 Dublin et al. .................. 705/14
2009/0113468 A1 * 4/2009 Steelberg et al. ............... 725/32
2009/0171487 A1 * 7/2009 Wilhelm ......................... 700/94
2010/0036906 A1 * 2/2010 Song ...................... G06Q 30/02 709/203
2010/0169503 A1 * 7/2010 Kollmansberger .......................... H04L 67/2804 709/231
2010/0235741 A1 9/2010 Newman et al.
2011/0106954 A1 5/2011 Chatterjee et al.
2013/0347018 A1 12/2013 Limp et al.
2014/0129015 A1 5/2014 Lindahl et al.
2014/0277639 A1 9/2014 Gomes-Casseres et al.

FOREIGN PATENT DOCUMENTS

WO 2003093950 A2 11/2003
WO WO 2009101488 A1 * 8/2009

OTHER PUBLICATIONS

"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
"Denon 2003-2004 Product Catalog," Denon 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

ADVERTISING IN A DIGITAL MEDIA PLAYBACK SYSTEM

CROSS-REFERENCE TO RELATED APPLICATION

This application claims the benefits of the provisional application No. 61/148,883, entitled "Advertising in a digital media playback system", filed Jan. 30, 2009, which is hereby incorporated by reference for all purposes.

BACKGROUND OF THE INVENTION

Field of the Invention

The present invention generally relates to the area of consumer electronics, and more particularly, relates to techniques for advertising in a digital media playback system using structured metadata.

Description of Related Art

The advertisement industry penetrates every aspect of our life. Traditional advertising channels including newspapers, radio, and television offer variety of products that can be tailored to virtually any market and satisfy companies of any size. However, they can only provide static content and cannot engage potential customers interactively. Rapid growth of the Internet offers the advertisers a unique opportunity to make interactive advertisement campaigns possible by allowing end users to close the loop, namely inducing users to click on an advertisement being served or linking the users to the actual product or service being advertised.

Musical industry thrives by promoting new artists, albums, and individual songs and etc. Unlike advertising in TV or on the Internet where advertisements of services or products can be readily inserted as footage in a TV program or a clickable graphic banner, advertising in music programs is relatively difficult because it would be too sensible to insert an advertisement in the middle of music. Accordingly, most advertising in music programs take place between two musical pieces.

Publishers in musical industry supplement their revenue with advertising and connecting the audience with other products or services the audience may desire. Advertising only between two musical pieces may not get a close attention from a listener as the listener may switch to another piece of music when a previous one is over. Thus there is a need for solutions that allow advertising to happen anytime an advertiser may deem appropriate to get the attention from a listener.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to advertising through a digital media playback system. According to one aspect of the invention, advertisement information is embedded in multimedia data stream as structured metadata, and transmitted through digital networks. Multimedia players installed in different locations or zones are configured to receive the multimedia stream data, and detect the presence of the embedded structured metadata. Through a network interface in a player, the metadata information is transmitted to and displayed on a controller. A user input interface in the controller allows a user to respond to the displayed advertisement and obtain desired information accordingly.

According to another aspect of the present invention, the controller displays an alerting message to get an attention from the user. The message stays till the user responds to it. The message may include one or more scripts that, when activated, fetch more data from a network for display on the controller. Depending on implementation, commercial messages may be displayed or delivered to a predefined email address.

The present invention may be implemented in many forms including a method, a system, an apparatus or a part of a system. According to one embodiment, the present invention is a method for advertising in an audio signal, the method comprises: receiving a streaming audio signal; determining in a player whether there is a tag embedded in the streaming audio signal; transporting data representing the tag from the player to a controller with a display screen when a tag is indeed detected; and causing the controller to gain attention from a user, wherein the controller stays till the user reacts to the controller, the controller is displaying an image instructing what the user needs to do.

According to another embodiment, the invention is a digital media playback advertising system. The system comprises: at least one player configured to receive a streaming audio signal and detect whether there is a tag embedded in the streaming audio signal; and at least one controller configured to control operations of the player, wherein the player transports data representing the tag from the player to the controller with a display screen, when the tag is indeed detected, the controller is configured to gain attention from a user, the controller stays is displaying an image instructing what the user needs to do.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3A shows an exemplary sequence of data packets representing an audio signal being streamed to a zone player for playback;

FIG. 3B shows one or more of the data packets embedded with metadata or tags.

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
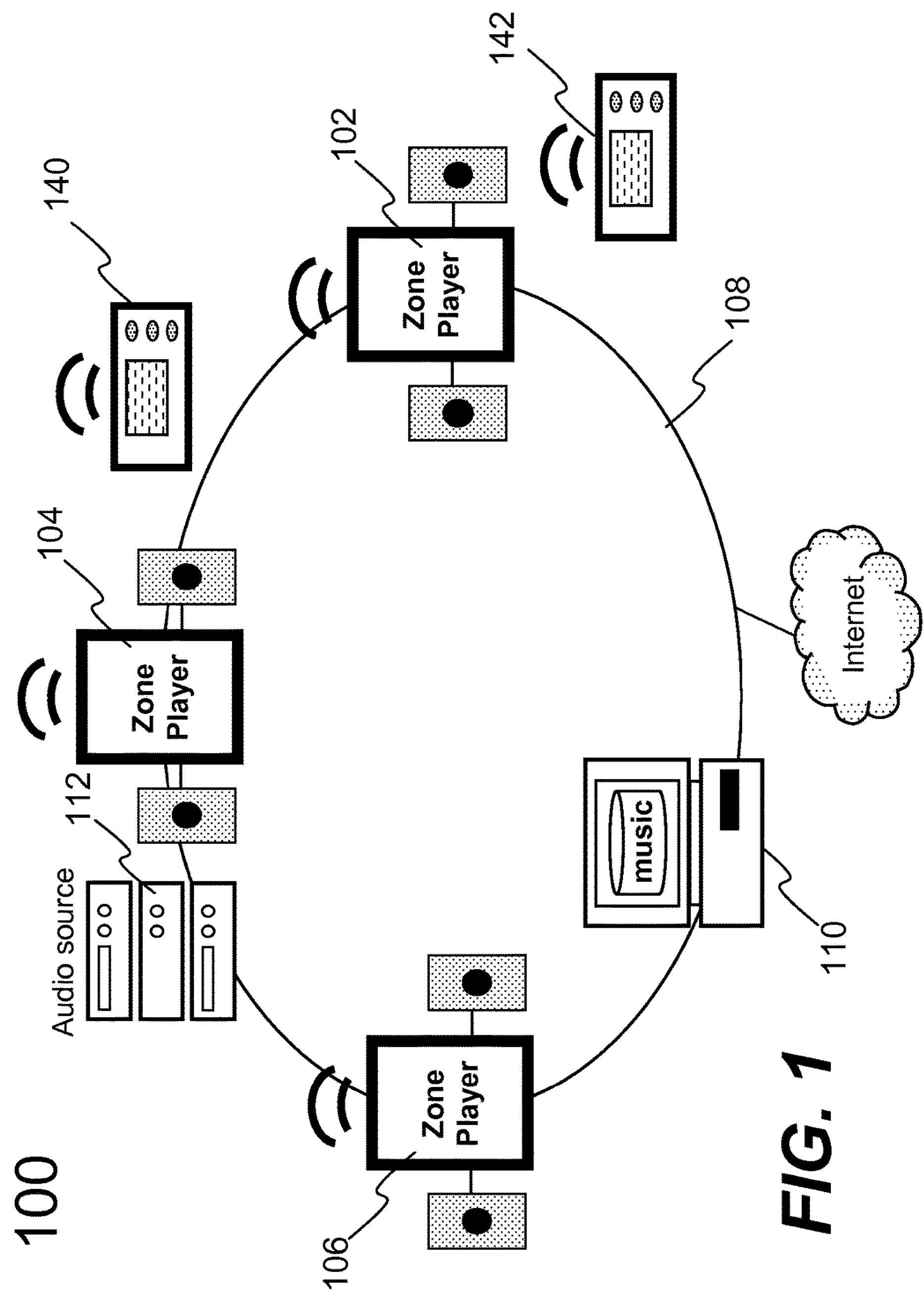
FIG. 1 shows an exemplary configuration 100 in which the present invention may be practiced.

Referring now to the drawings, in which like numerals refer to like parts throughout the several views. FIG. 1 shows an exemplary configuration 100 in which the present invention may be practiced. The configuration may represent, but not be limited to, a part of a residential home, a business building or a complex with multiple zones. There are a number of multimedia players of which three examples 102, 104 and 106 are shown as audio devices. Each of the audio devices may be installed or provided in one particular area or zone and hence referred to as a zone player herein.

As used herein, unless explicitly stated otherwise, an audio source or audio sources are in digital format and can be transported or streamed over a data network. To facilitate the understanding of the present invention, it is assumed that the configuration 100 represents a home. Thus, the zone player 102 and 104 may be located in two of the bedrooms respectively while the zone player 106 may be installed in a living room. All of the zone players 102, 104 and 106 are coupled directly or indirectly to a data network 108. In addition, a computing device 110 is shown to be coupled on the network 108. In reality, any other devices such as a home gateway device, a storage device, or an MP3 player may be coupled to the network 108 as well.

The network 108 may be a wired network, a wireless network or a combination of both. In one example, all devices including the zone players 102, 104 and 106 are coupled to the network 108 by wireless means based on an industry standard such as IEEE 802.11. In yet another example, all devices including the zone players 102, 104 and 106 are part of a local area network that communicates with a wide area network (e.g., the Internet).

Many devices on the network 108 are configured to download and store audio sources. For example, the computing device 110 can download audio sources from the Internet and store the downloaded sources locally for sharing with other devices on the Internet or the network 108. The computing device 110 or any of the zone players can also be configured to receive streaming audio. Shown as a stereo system, the device 112 is configured to receive an analog audio source (e.g., from broadcasting) or retrieve a digital audio source (e.g., from a compact disk). The analog audio sources can be converted to digital audio sources. In accordance with the present invention, the audio source may be shared among the devices on the network 108.

Two or more zone players may be grouped together to form a new zone group. Any combinations of zone players and an existing zone group may be grouped together. In one instance, a new zone group is formed by adding one zone player to another zone player or an existing zone group. It should be noted that a signal that a zone player depends upon to play back is a sequence of data packets having a destination address to the zone player.

Also shown in FIG. 1 is a controller 140 or 142 that may be a dedicated portable device with a display screen. The controller 140 or 142 is equipped with network capability (e.g., Wi-Fi or Ethernet) to control any of the zone players. In one embodiment, the controller 140 is simply a cellphone (e.g., iPhone) loaded with an application module. When the application module is activated, the cellphone acts as a controller to control any of the zone players.

Figure 2A:
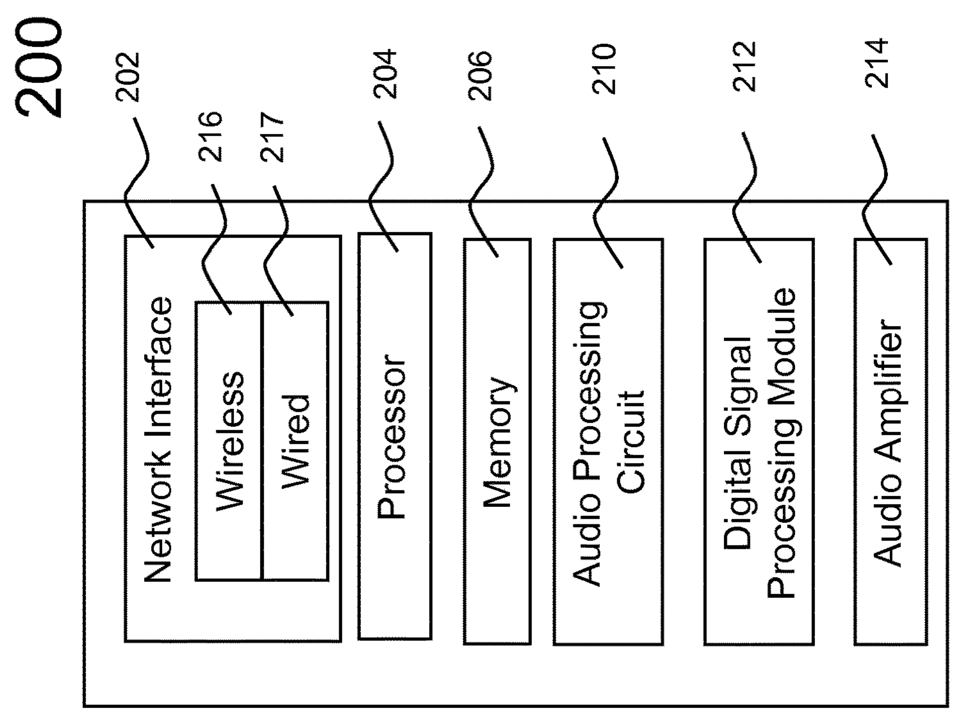
FIG. 2A shows an exemplary functional block diagram of a zone player.

Referring now to FIG. 2A, there is shown an exemplary functional block diagram of a zone player 200 in accordance with the present invention. The zone player 200 includes a network interface 202, a processor 204, a memory 206, an audio processing circuit 210, a digital signal processing module 212, and optionally, an audio amplifier 214 that may be internal or external. The network interface 202 facilitates a data flow between a data network (i.e., the data network 108 of FIG. 1) and the zone player 200, and typically executes a special set of rules (i.e., a protocol) to send data back and forth. One of the common protocols used in the Internet is TCP/IP (Transmission Control Protocol/Internet Protocol). In general, a network interface manages the assembling of an audio source or file into smaller packets that are transmitted over the data network or reassembles received packets into the original source or file. In addition, the network interface 202 handles the address part of each packet so that it gets to the right destination or intercepts packets destined for the zone player 200.

The network interface 202 may include one or both of a wireless interface 216 and a wired interface 217. The wireless interface 216, also referred to as a RF interface, provides network interface functions by a wireless means for the zone player 200 to communicate with other devices in accordance with a communication protocol (such as the wireless standard IEEE 802.11a, 802.11b or 802.11g). The wired interface 217 provides network interface functions by a wired means (e.g., an Ethernet cable). In one embodiment, a zone player includes both of the interfaces 216 and 217, and other zone players include only a RF or wired interface. Thus these other zone players communicate with other devices on a network or retrieve audio sources via the zone player. The processor 204 is configured to control the operation of other parts in the zone player 200. The memory 206 may be loaded with one or more software modules that can be executed by the processor 204 to achieve desired tasks.

According to one embodiment of the present invention, a software module implementing one embodiment of the present invention is executed, the processor 204 operates in accordance with the software module in reference to a saved zone group configuration characterizing a zone group created by a user, the zone player 200 is caused to retrieve an audio source from another zone player or a device on the network.

According to another embodiment of the present invention, the memory 206 is used to save one or more saved zone configuration files that may be retrieved for modification at any time. Typically, a saved zone group configuration file is transmitted to a controller (e.g., the controlling device 140 or 142 of FIG. 1, a computer, or a portable device) when a user operates the controlling device. The zone group configuration provides an interactive user interface so that various manipulations or control of the zone players may be performed.

The audio processing circuit 210 resembles most of the circuitry in an audio playback device and includes one or more digital-to-analog converters (DAC), an audio preprocessing part, an audio enhancement part or a digital signal processor and others. In operation, when an audio source is retrieved via the network interface 202, the audio source is processed in the audio processing circuit 210 to produce analog audio signals. The processed analog audio signals are then provided to the audio amplifier 214 for playback on speakers. In addition, the audio processing circuit 210 may include necessary circuitry to process analog signals as inputs to produce digital signals for sharing with other devices on a network.

Depending on an exact implementation, the digital signal processing module 212 may be implemented within the audio processing circuit 210 or as a combination of hardware and software. The audio amplifier 214 is typically an analog circuit that powers the provided analog audio signals to drive one or more speakers.

Figure 2B:
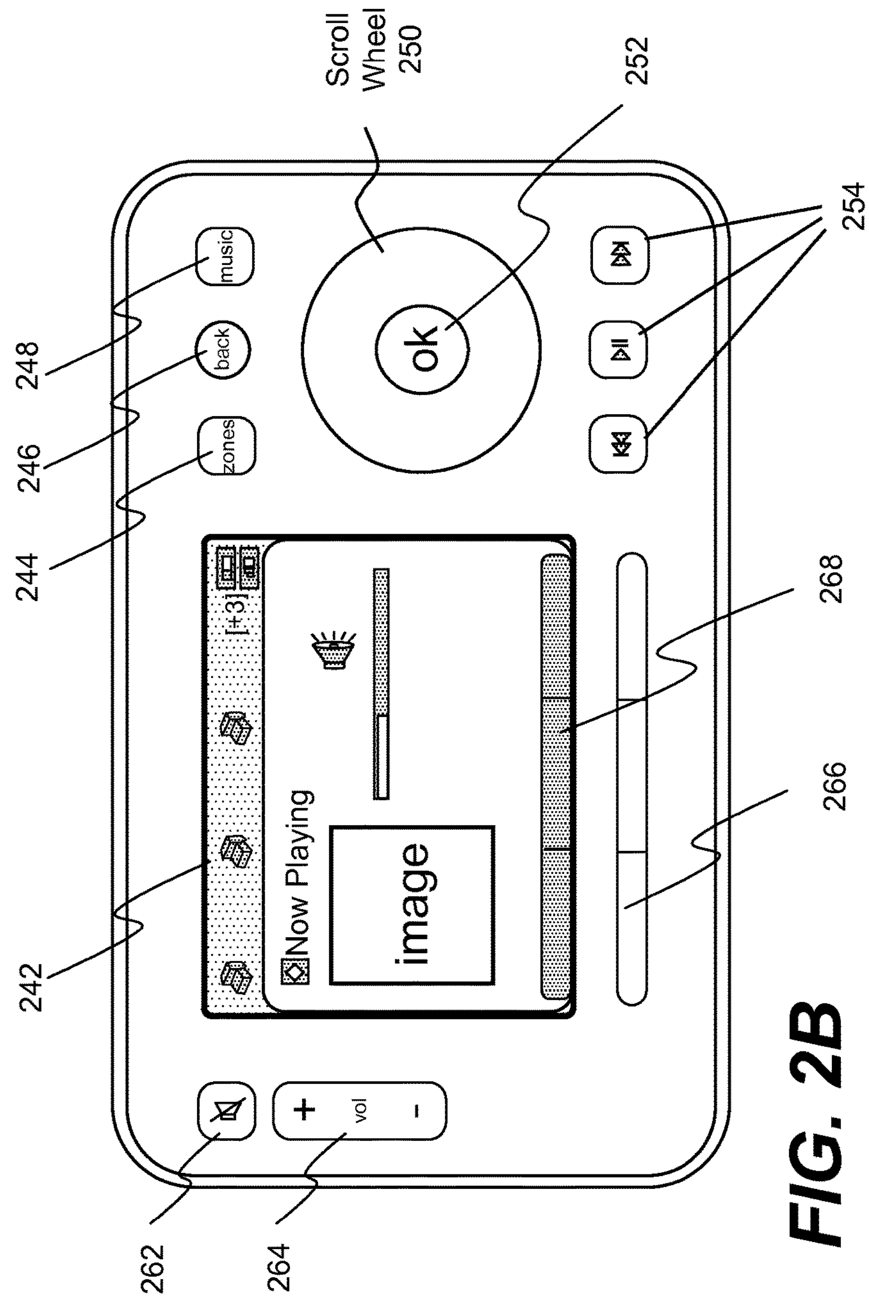
FIG. 2B shows an example of a controller.

Referring now to FIG. 2B, there is shown an example of a controller 240, which may correspond to the controlling device 140 or 142 of FIG. 1. The controller 240 may be used to facilitate the control of multi-media applications, automation and others in a complex. In particular, the controller 240 is configured to facilitate a selection of a plurality of audio sources available on the network, controlling operations of one or more zone players (e.g., the zone player 200) through a RF interface corresponding to the RF interface 216 of FIG. 2A. According to one embodiment, the wireless means is based on an industry standard (e.g., infrared, radio, wireless standard IEEE 802.11a, 802.11b or 802.11g). When a particular audio source is being played in the zone player 200, a picture, if there is any, associated with the audio source may be transmitted from the zone player 200 to the controller 240 for display. In one embodiment, the controller 240 is used to synchronize more than one zone players by grouping the zone players in a group. In another embodiment, the controller 240 is used to control the volume of each of the zone players in a zone group individually or together.

The user interface for the controller 240 includes a screen 242 (e.g., a LCD screen) and a set of functional buttons as follows: a "zones" button 244, a "back" button 246, a "music" button 248, a scroll wheel 250, "ok" button 252, a set of transport control buttons 254, a mute button 262, a volume up/down button 264, a set of soft buttons 266 corresponding to the labels 268 displayed on the screen 242.

The screen 242 displays various screen menus in response to a user's selection. In one embodiment, the "zones" button 244 activates a zone management screen or "Zone Menu", which is described in more details below. The "back" button 246 may lead to different actions depending on the current screen. In one embodiment, the "back" button triggers the current screen display to go back to a previous one. In another embodiment, the "back" button negates the user's erroneous selection. The "music" button 248 activates a music menu, which allows the selection of an audio source (e.g., a song) to be added to a zone player's music queue for playback.

The scroll wheel 250 is used for selecting an item within a list, whenever a list is presented on the screen 242. When the items in the list are too many to be accommodated in one screen display, a scroll indicator such as a scroll bar or a scroll arrow is displayed beside the list. When the scroll indicator is displayed, a user may rotate the scroll wheel 250 to either choose a displayed item or display a hidden item in the list. The "ok" button 252 is used to confirm the user's selection on the screen 242.

There are three transport buttons 254, which are used to control the effect of the currently playing song. For example, the functions of the transport buttons may include play/pause and forward/rewind a song, move forward to a next song track, or move backward to a previous track. According to one embodiment, pressing one of the volume control buttons such as the mute button 262 or the volume up/down button 264 activates a volume panel. In addition, there are three soft buttons 266 that can be activated in accordance with the labels 268 on the screen 242. It can be understood that, in a multi-zone system, there may be multiple audio sources being played respectively in more than one zone players.

According to another embodiment, the controller 240 is emulated on a portable device (e.g., iPhone). An application module implementing the functions of the controller 240 may be loaded into a portable device. Once the application module is activated, many keys or buttons as illustrated in FIG. 2B can be emulated as soft keys to control one or more of the zone players. Likewise, the controller 240 is emulated on a computer (e.g., a PC).

Figure 2C:
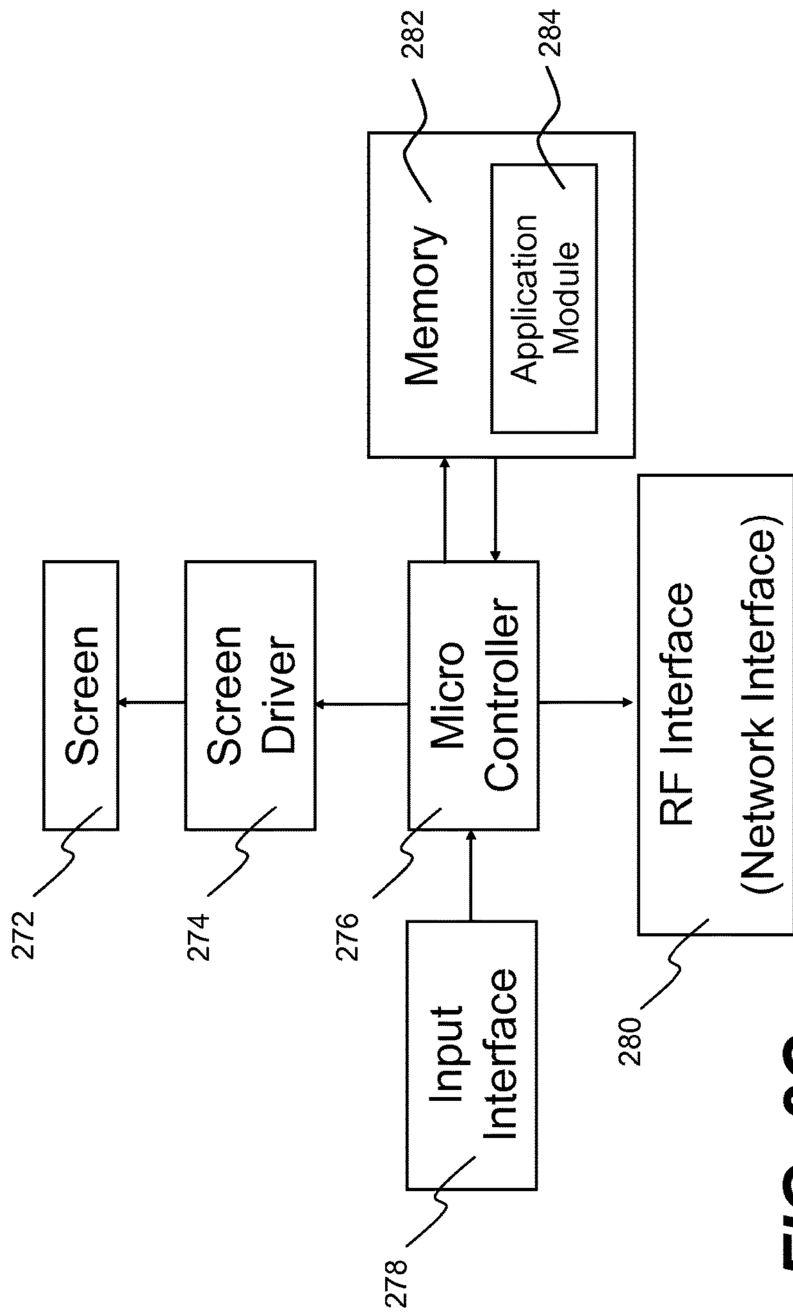
FIG. 2C shows an internal functional block diagram of an exemplary controller.

FIG. 2C illustrates an internal functional block diagram of an exemplary controller 270, which may correspond to the controller 240 of FIG. 2B. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module is configured to react on one or more tags or metadata embedded in a sequence of data packets being played back on one of the zone players being controlled by the controller 270. As detailed below, an audio signal represented by a sequence of data packets is embedded with one or more tags or metadata. When the metadata is played, without affecting the audio quality, the controller 270 is caused by the module 284, for example, to display a corresponding commercial message and cause a commercial message to be noticed or delivered to the user. In another embodiment, the application module 284 is configured to enable the controller to access more detailed information about a commercial or non-commercial item. In operation, when the microcontroller 276 executes one of the application modules 284, the screen driver 274 generates control signals to drive the screen 272 to display an application specific user interface accordingly, more of which will be described below.

The controller 270 includes a network interface 280 referred to as a RF interface 280 that facilitates wireless communication with a zone player via a corresponding RF interface thereof. In one embodiment, the commands, such as volume control and audio playback synchronization, are sent via the RF interfaces. In another embodiment, a saved zone group configuration is transmitted between a zone player and a controller via the RF interfaces. The controller 270 may control one or more zone players, such as 102, 104 and 106 of FIG. 1. Nevertheless, there may be more than one controllers, each preferably in a zone (e.g., a room) and configured to control any one and all of the zone players.

According to one embodiment, an audio signal (i.e., a sequence of data packets) is embedded with one or more tags or structured metadata. When the audio signal with metadata is played, a listener may readily "click" or be prompted to get more information without disrupting the user experience (i.e., the audio playback). For example, if NPR's Fresh Air is featuring the music band Radiohead, then the data stream could include metadata with links to online music services (e.g., Rhapsody, iTunes) such that users can find more information about Radiohead or their new album simply by navigating with a controller (or a handheld device interfacing the digital data stream).

Another example is with streaming movies that include embedded metadata or tags related to objects in the movie. If someone is watching such a movie and likes the car being driven by the actor, the viewer can click to learn more about the car simply because the information is embedded in the data stream.

In one embodiment, structured meta-data with advertising is provided to prompt a listener for more information on goods/services being advertised. For example, if a listener is listening to Internet Radio that includes an advertisement for Ford cars, the listener could browse for more information or use a simple notification (such as "click" a well-defined button or specific location on a touch-screen) and the service will send the listener (e.g., via email) more information about Ford cars.

In one embodiment, a service provider inserts an advertisement into a media playlist. The advertisement contains a special metadata element that indicates that this is an advertisement, along with a unique identifier for the ad. Additionally, the advertisement can contain metadata such as a call to action, e.g., "Press OK on your controller to learn more.", or a call to action can be in the media stream itself, i.e., as a voiceover.

Upon seeing this special metadata element, either a zone player or a controller is caused to enter a mode to induce a listener to press a predefined key on the controller. As a result, a network transaction is made back to the controller with the ID of the advertisement, the time of day, and user's household ID and a serial number. Depending on implementation, the transaction may be provided to the music provider or advertiser, and/or retain the information. If the listener has a registered email address, his/her email address may be provided to the advertiser that may distribute more detailed information about the product or service to the listener.

Figures 3A, 3B:
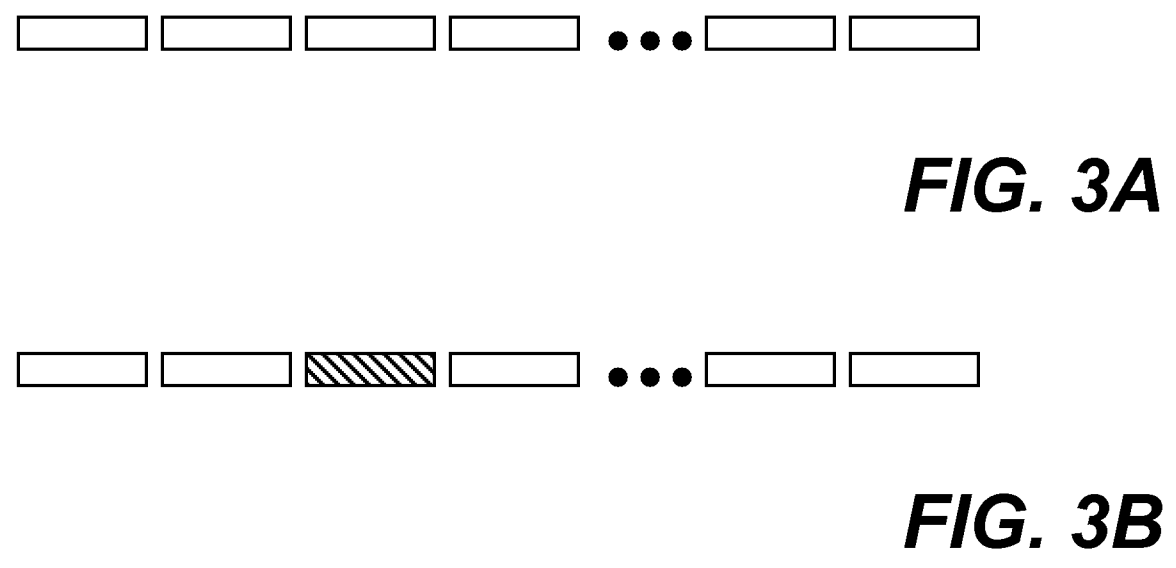

FIG. 3A shows an exemplary sequence of data packets representing an audio signal being streamed to a zone player for playback. FIG. 3B shows one or more of the data packets embedded with metadata or tags (e.g., script). As the sequence keeps coming, the tag activates the zone player to cause a controller to gain attention from a user (e.g., a listener) or retrieve additional data from a designated source (e.g., a server operated by an advertiser or an AD network).

Depending on implementation, the controller may be caused to display a predefined screen showing an advertisement or require the user to follow up an action (e.g., clicking or pressing a button). In one embodiment, the controller is caused to fetch data from a server, the data represents an advertisement. In another embodiment, the data presents more detailed information about an item being represented by the tag. In still another embodiment, a sequence of actions as a result of the embedded metadata in an audio sequence is cached in a memory of the controller, awaiting corresponding actions from a user.

Figure 4:
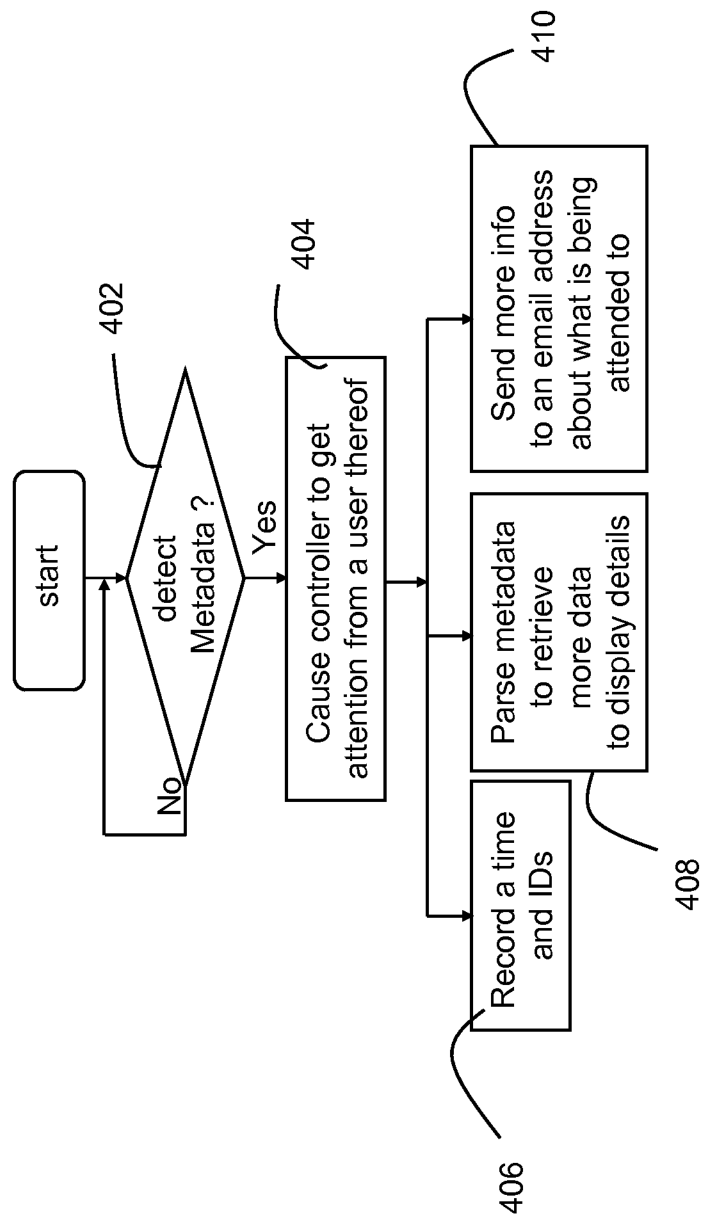
FIG. 4 shows a process or flowchart of activating a controller to distribute advertising information via a process of playing back an audio data sequence.

FIG. 4 shows a process or flowchart of activating a controller to distribute advertising information via a process of playing back an audio data sequence to teach and refer to various features, detailed designs, uses, advantages, configurations and characteristics in one embodiment of the present invention.

Referring to FIG. 4, the process 400 begins with a zone player detecting the presence of an embedded metadata at 402. As described above, a zone player receives data packets destined thereto. The data packets may come from another device, another zone player or received directly from a network. The zone player plays back the audio in accordance with the received data packets. As described above, the zone player is configured to detect whether a stream of the data packets is embedded with metadata or a script (collectively referred to as tag).

In an event, such a tag is detected, the zone player is activated to transmit the tag to a controller that is being used to control it at 404. In one embodiment, the interface module in the zone player reformats the tag (in one or more data packets destined to the controller) to trigger a function configured to process the tag. For example, upon receiving the tag, the controller is activated to generate an alerting message to get an attention from a user. Depending on implementation, the alerting message may be a pop-up graphic display, a clickable link, a sound or other message that requires an action from the user. It should be noted that such an alerting message does not affect in any way the playback of the zone player. According to one embodiment, a graphic image being displayed as an alerting message is embedded with a script that can be activated to cause the controller or a zone player to retrieve various messages or displays from another device.

When the user reacts towards the alerting message (e.g., clicking on the display), one or more of the following actions may be carried out: recording a time and ID of the controller at 406, parsing metadata to retrieve more data to display details of advertisement at 408, or sending more information to an email address about what is being attended to at 410.

According to another embodiment, when a user is signed up for audio service offered by a service provider, the user is asked to provide some information about his hobby or interest (e.g., what is being planned to purchase) in an account. When a tag is detected in an audio stream by a zone player, the controller or the zone player is activated to send a message to a server affiliated with the service provider. The server is configured to send an email message pertaining to an advertisement to an email account of the user or responds with an advertisement, where the advertisement is closely related to the listed bobby or interest.

Depending on implementation, the tags may be embedded in a data sequence by an advertiser, a service provider or a distributor or vendor. The embedded data may be displayed in a predefined way. For example, each consumer electronics vendor can display this information (or prompt users) in their own way that is best tailored to their experience (rather than the broadcasters just incorporating information over an audio or video).

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

What is claimed is:

1. A method comprising:

instantiating, at a zone audio playback device, a zone group configuration, the zone group configuration causing the zone audio playback device and a second zone audio playback device to be organized according to a zone group such that the zone audio playback device and the second zone audio playback device are configured to play back audio in synchrony, and wherein the zone audio playback device and the second zone audio playback device are communicatively coupled by a first network, wherein each of the zone audio playback device and the second zone audio playback device comprises at least one speaker;

sending, by the zone audio playback device, a request for media content to a service provider, the request comprising a uniform resource indicator (URI) associated with the media content;

based on the request, retrieving, by the zone audio playback device from the service provider, a streaming audio signal comprising an audio stream and a tag, wherein the audio stream retrieved by the zone audio playback device is based on selection of a song from a playlist of songs displayed on a controller device that is communicatively coupled to the zone audio playback device by a second network, wherein the zone audio playback device is in a zone group with the second zone audio playback device according to the zone group configuration, and wherein the controller device controls playback operations of the zone audio playback device and the second zone audio playback device;

parsing, by the zone audio playback device, the received streaming audio signal to identify the audio stream and the tag in the streaming audio signal;

after the tag is identified and based on the identified audio stream, playing, by the zone audio playback device in synchrony with the second zone audio playback device in the zone group according to the zone group configuration, at least a portion of the audio stream;

based on the identified tag, causing, by the zone audio playback device, an advertisement to be inserted into the playlist of songs being played back and a voiceover related to the advertisement to be included in the playback of at least the portion of the audio stream by the zone audio playback device, the playlist of songs displayed on the controller device, wherein the advertisement inserted into the playlist of songs is associated with an email corresponding to the advertisement, and wherein causing the advertisement to be inserted into the playlist of songs being played back comprises transmitting, by the zone audio playback device, the tag to the controller device;

receiving, by the zone audio playback device from the controller device, an indication that the advertisement inserted into the playlist is selected, wherein the selection of the advertisement inserted into the playlist of songs comprises scrolling the playlist to display the advertisement, wherein scrolling the playlist comprises scrolling the songs in the playlist which causes the advertisement in the playlist to scroll; and wherein the selection of the advertisement does not affect playback of the at least the portion of the audio stream by the zone audio playback device; and sending, by the zone audio playback device via a third network, a message to a server affiliated with the service provider of the audio stream to trigger the server to send the email corresponding to the selected advertisement;

wherein the advertisement is based on an interest of a user provided by the user to the service provider when the user signed up for an audio service of the service provider.

2. The method of claim 1, wherein the email is sent to a user account associated with controller device of the zone audio playback device.

3. The method of claim 1, wherein the advertisement comprises information associated with the audio stream.

4. The method of claim 1, further comprising:

playing, by the zone audio playback device, the audio stream, wherein the zone audio playback device sends the message without affecting playback of the audio stream at the zone audio playback device.

5. The method of claim 1, further comprising: relaying, by the zone audio playback device, the audio stream from the streaming audio signal to the second zone audio playback device in the zone group to play back at least a portion of the audio stream in synchrony with the zone audio playback device.

6. The method of claim 1, further comprising receiving, at the zone audio playback device from the controller device, an instruction to instantiate the saved zone group configuration at the zone audio playback device.

7. The method of claim 1, wherein retrieving, by the zone audio playback device from the service provider, the streaming audio signal further comprises retrieving, by the zone audio playback device based on the saved zone configuration, the streaming audio signal from the service provider.

8. The method of claim 1, wherein sending, by the zone audio playback device via a third network, a message further comprises triggering the server to send the advertisement to an email account of a user of the zone audio playback device pier.

9. The method of claim 1, wherein the second network is the first network.

10. A non-transitory computer readable storage medium including instructions for execution by a processor, the instructions when executed implementing a method comprising:

instantiating, at a zone audio playback device, a zone group configuration, the zone group configuration causing the zone audio playback device and a second zone audio playback device to be organized according to a zone group such that the zone audio playback device and the second zone audio playback device are configured to play back audio in synchrony, and wherein the zone audio playback device and the second zone audio playback device are communicatively coupled by a first network, wherein each of the zone audio playback device and the second zone audio playback device comprises at least one speaker;

sending, by the zone audio playback device, a request for media content to a service provider, the request comprising a uniform resource indicator (URI) associated with the media content;

based on the request, retrieving, by the zone audio playback device from the service provider, a streaming audio signal comprising an audio stream and a tag, wherein the audio stream retrieved by the zone audio playback device is based on selection of a song from a playlist of songs displayed on a controller device that is communicatively coupled to the zone audio playback device by a second network, wherein the zone audio playback device is in a zone group with the second zone audio playback device according to the zone group configuration, and wherein the controller device controls playback operations of the zone audio playback device and the second zone audio playback device;

parsing, by the zone audio playback device, the received streaming audio signal to identify the audio stream and the tag in the streaming audio signal;

after the tag is identified and based on the identified audio stream, playing, by the zone audio playback device in synchrony with the second zone audio playback device in the zone group according to the zone group configuration, at least a portion of the audio stream;

based on the identified tag, causing, by the zone audio playback device, an advertisement to be inserted into the playlist of songs being played back and a voiceover related to the advertisement to be included in the playback of at least the portion of the audio stream by the zone audio playback device, the playlist of songs displayed on the controller device, wherein the advertisement inserted into the playlist of songs is associated with an email corresponding to the advertisement, and wherein causing the advertisement to be inserted into the playlist of songs being played back comprises transmitting, by the zone audio playback device, the tag to the controller device;

receiving, by the zone audio playback device from the controller device, an indication that the advertisement inserted into the playlist is selected, wherein the selection of the advertisement inserted into the playlist of songs comprises scrolling the playlist to display the advertisement, wherein scrolling the playlist comprises scrolling the songs in the playlist which causes the advertisement in the playlist to scroll; and wherein the selection of the advertisement does not affect playback of the at least the portion of the audio stream by the zone audio playback device; and sending, by the zone audio playback device via a third network, a message to a server affiliated with the service provider of the audio stream to trigger the server to send the email corresponding to the selected advertisement;

wherein the advertisement is based on an interest of a user provided by the user to the service provider when the user signed up for an audio service of the service provider.

11. The computer readable storage medium of claim 10, wherein the email is sent to a user account associated with the controller device of the zone audio playback device.

12. The computer readable storage medium of claim 10, wherein the advertisement comprises information associated with the audio stream.

13. The computer readable storage medium of claim 10, wherein the method further comprises:

playing, by the zone audio playback device, the audio stream, wherein the zone audio playback device sends the message without affecting playback of the audio stream at the zone audio playback device.

14. The non-transitory computer readable storage medium of claim 10, wherein sending, by the zone audio playback device via a third network, a message further comprises triggering the server to send the advertisement to an email account of a user of the zone audio playback device.

15. The computer readable storage medium of claim 10, wherein the second network is the first network.

* * * * *